April 22, 1952 R. H. LONG ET AL 2,593,581
TRANSMISSION OPERATING MECHANISM
Filed Sept. 1, 1948 2 SHEETS—SHEET 1

INVENTORS
RICHARD H. LONG
BY EDWIN E. PRATHER
H O Clayton
ATTORNEY

April 22, 1952  R. H. LONG ET AL  2,593,581
TRANSMISSION OPERATING MECHANISM
Filed Sept. 1, 1948  2 SHEETS—SHEET 2

INVENTORS
RICHARD H. LONG
BY EDWIN E. PRATHER
ATTORNEY

Patented Apr. 22, 1952

2,593,581

UNITED STATES PATENT OFFICE 2,593,581

TRANSMISSION OPERATING MECHANISM

Richard H. Long and Edwin E. Prather, South Bend, Ind., assignors to Bendix Aviation Corporation, South Bend, Ind., a corporation of Delaware Application September 1, 1948, Serial No. 47,286

9 Claims. (Cl. 192—.073)

This invention relates in general to the power transmission mechanism of the power plant of an automotive vehicle and in particular to power and manually operated means for operating the change speed transmission of said power plant and for operating the friction clutch to facilitate the operation of the transmission.

One of the objects of our invention is to provide, in an automotive vehicle including a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission being effected by power means if the driver elects this operation of the mechanism the latter operation being facilitated by a power operation of the friction clutch.

A further object of our invention is to provide, in an automotive vehicle including a power plant comprising an accelerator, a friction clutch, a three speeds forward and reverse transmission, and a gear shift lever; means for operating and for facilitating the operation of said transmission, said means including power means, comprising a plurality of single acting motors, which are automatically operable, after the shift lever is placed in its high gear position and the accelerator is released, to establish the transmission either in its second gear setting or its high gear setting, depending upon the speed of the vehicle, the friction clutch being operated by one of said motors to facilitate this operation of the transmission, said means further including manually operated means for effecting, at any time, any one of the gear settings of the transmission.

A further object of our invention is to provide, in the power plant of an automotive vehicle including a three speeds forward and reverse transmission, a friction clutch and a gear shift lever, a manually and power operated mechanism for operating the transmission and friction clutch said mechanism being capable of a manual operation to operate the transmission and also capable, when the accelerator is released and the shift lever is placed in its high gear position, of effecting a power operation of the transmission to alternately effect the high gear and second gear settings thereof, the friction clutch being disengaged to facilitate each of said operations and automatically re-engaged after each operation is completed; and another object of our invention is to include, in such a mechanism, means for disconnecting the shift lever from the transmission when the latter is being power operated.

Yet another object of our invention is to provide, in the power plant of an automotive vehicle including a three speeds forward and reverse transmission, a friction clutch and a transmission operating gear shift lever, a manually and power operated mechanism for operating the transmission and clutch, said mechanism including a shift lever operated linkage for manually operating the transmission, power means for operating the transmission to alternately establish the same in the high and second gear settings and for operating the clutch to facilitate said operations of the transmission, and power means, operable when the shift lever is placed in its high gear position, to render the first mentioned power means operative and to disconnect portions of the force transmitting linkage to thereby render the shift lever immobile when the transmission is being power operated; and a further object of our invention is to provide means for so controlling the first mentioned power means as to expedite an operation of the mechanism to make possible a resumption of the manual operation of the transmission when it is desired to discontinue the power operation thereof.

A further object of our invention is to provide, in the power plant of an automotive vehicle including a three speeds forward and reverse transmission, a friction clutch and a transmission operating gear shift lever, a manually and power operated mechanism for operating the transmission and clutch, said mechanism including a shift lever operated linkage for manually operating the transmission, a shift lever operated control means for effecting a power operation of the clutch when the transmission is being manually operated, power means for operating the transmission to alternately establish the same in its second and high gear settings and for operating the clutch to facilitate said power operation of the said transmission, and other power means, including a spring and pressure differential operated motor operable, when the shift lever is placed in its high gear setting to render the first mentioned power means operative and to immobilize the gear shift lever, said spring and pressure differential operated power motor also serving, by a spring operation thereof and after the shift lever is moved out of its high gear position, to so operate the first mentioned power means as to facilitate the resumption of the manual operation of the transmission.

It follows therefore that one of the important features of our invention is to improve upon the transmission operating mechanism disclosed in the application of Earl R. Price, No. 779,164 filed October 10, 1947, now Patent No. 2,557,795, issued June 19, 1951, the principal feature of said improvement lying in means for rendering the gear shift member immobile when the power means of the mechanism is operating the transmission.

The above and other objects and features of the invention will appear more fully hereinafter from a consideration of the following description taken in connection with the accompanying drawings wherein one embodiment of the invention is illustrated by way of example.

Figures 1, 2:
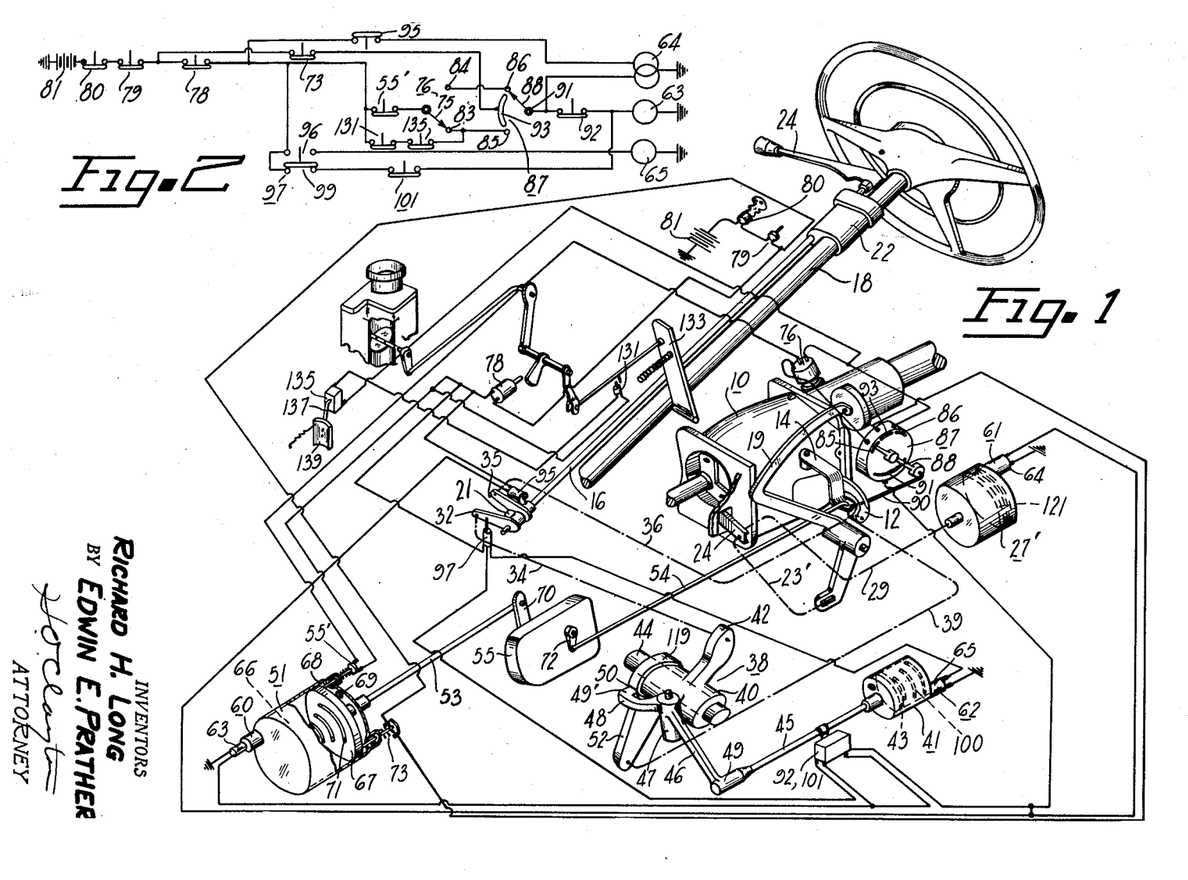
Figure 1 is a diagrammatic view of our invention disclosing the principal features thereof.
Figure 2 is a wiring diagram of the electrical mechanism disclosed in Figure 1.

Referring now to Figure 1 disclosing a preferred embodiment of our invention, a three speeds forward and reverse transmission 10 is operated by means of a manually operated crank 12 and a manually and power operated crank 14, the crank 12 serving to operate the transmission to establish the same in either its low gear setting or its reverse gear setting and the crank 14 serving to operate that part of the transmission functioning to establish the same in either its second gear setting or the high gear setting. The linkage for actuating the cranks 12 and 14 is disclosed in Figures 1 and 6 and include a rod 16 extending alongside the steering post 18 of the vehicle and secured to said post by brackets 20, 21, and 22. The rod 16 is moved bodily upwardly and downwardly along the steering post by a manually operable gear shift lever 24 and said rod is rotated about its axis by an angular movement of said lever. A pin 26 is secured to the rod 16 and the latter is biased downwardly by a spring 31 so that the pin is moved into engagement with a slot 27 in a flange 28 fixedly secured to a sleeve 30 rotatably mounted on said rod; and a crank member 32 is fixedly secured to the sleeve 30 so that rotation of the rod when the pin is in engagement with a slot 27, will result in a rotation of the crank 32.

Upward movement of the rod 16, in the operation of effecting either a reverse gear or low gear operation of the transmission, serves to nest the upper end of the pin 26 within a slot 29 in a flange 23 fixedly secured to a sleeve 25 rotatably mounted on said rod; and a crank 35 is fixedly secured to the sleeve 25 said crank being rotated when the rod is rotated, the pin 26 at the time being nested within the slot 29. The flanges 23 and 28 and the pin 26 are housed within the support bracket 21 thereby protecting this mechanism from the elements; and the spring 31, which serves to bias the pin 26 into engagement with the flange 28 preparatory to effecting either a second gear or high gear operation of the transmission, is interposed between the sleeve 30 and a flange 33 secured to the rod 16.

Our invention has to do with the manually and power operated means for actuating the transmission and for operating a conventional friction clutch, not shown, said clutch preferably including the usual driving and driven clutch plates forced into engagement by the operation of clutch springs and centrifugal weights. The transmission and clutch may be of conventional design; accordingly, no claim is made thereto and the same is not disclosed in the drawings. The clutch is operably connected to the clutch pedal 19 of the car by a means including a crank 24' and a rod 23', the connection between the clutch pedal and the rod being of the lost motion type to make possible a power operation of the clutch without moving the clutch pedal. As to this power operation of the clutch this is effected by a single acting pressure differential operated motor 27' operably connected to the crank 24 by a rod 29.

Describing now the connection between the cranks 32 and 35 and the transmission operating cranks 14 and 12, the latter crank, which is actuated to establish the transmission in either its low gear setting or its reverse gear setting, is connected to the crank 35 by a connection 36 and the crank 14, which is actuated to establish the transmission in either its second gear setting or its high gear setting, is connected to the crank 32 by connections 34 and 39 and a latch mechanism indicated as a whole in Figure 1 by the numeral 38. This latch mechanism includes a cylindrical sleeve 40 secured to the connection 34 by a crank 42 said cylinder being rotatably mounted on a support shaft 44. A lever 46 is pivotally secured at its hub portion 47 to the body of the cylindrical sleeve 40. One end portion 48 of the lever 46 constitutes a latch member adapted to nest within a recess 50 in a crank 52 rotatably mounted on the shaft 44; and the connection 39 is secured to one end of said crank. When the transmission is established in its high gear setting by a manual operation of the mechanism the parts of the latch mechanism assume the positions disclosed in Figure 1. The latch member 46 is preferably operated by a single acting pressure differential operated motor 41 the power element 43 of which is connected to the lever 46 by a rod 45; and the connection between the rod 45 and said lever preferably includes a universal joint 49.

The transmission may be power operated to establish the second gear setting or the high gear setting and to this end there is provided another single acting pressure differential operated motor 51 operably connected to the crank 14 by rods 53 and 54 which are interconnected by an alternator or often called direction changing mechanism 55. This alternator mechanism, which may be of the type disclosed in the aforementioned application of Earl R. Price, No. 779,164, is not disclosed in detail in this application inasmuch as the same constitutes, of itself, no part of our invention. Suffice it to say that successive operations of the motor 51 will effect a reciprocatory movement of the rod 54 to actuate the crank 14 to alternately establish the transmission in its second and high gear settings.

Describing now the means for controlling the operation of the transmission operating motor 51, the clutch operating motor 27', and the latch operating motor 41, each of said motors is preferably controlled by a three way valve said valves being indicated, respectively, by the reference numerals 60, 61, and 62; and said valves are actuated, respectively, by grounded solenoids 63, 64, and 65 disclosed diagrammatically in Figures 1 and 2. Describing the operation of the valve 60, which description will suffice for valves 61 and 62 inasmuch as the three mechanisms are identical, when the solenoid 63 is energized the valve 60 is opened to interconnect a control compartment 66 of the motor 51 with a source of suction, not shown, preferably the intake manifold of internal combustion engine of the vehicle. A compartment 66 is thus partially evacuated and a power element 67 of the motor is then subjected to a difference of pressures inasmuch as one side of the element 67 is exposed to the atmosphere which is admitted to a compartment 68 of the motor via an opening 69. The power element 67 is thus moved to the left, Figure 1, to actuate a power input crank 70 of the alternator 55; and this operation serves to actuate a power output crank 72 of the alternator to actuate the transmission operating crank 14 to operate the transmission.

Completing the description of the valve 60 when the solenoid 63 is de-energized a spring, not shown, serves to close the valve thereby venting the compartment 66 to the atmosphere. The return spring 71 within the compartment 66 then expands to move the power element 67 to the right thereby operating the alternator 55 to prepare for a subsequent actuation of the crank 72 to again operate the transmission 10. It is to be noted at this juncture that when the power element 67 is moved to the right, Figure 1, to its clutch engaged position that a breaker switch 73 is opened. This switch and its operation will be referred to hereinafter in the specification.

The electrical means for controlling the operation of the solenoids 62, 63, and 64 constitute one of the important features of our invention said electrical means being disclosed in Figures 1 and 2 particularly the latter figure. Describing this control means the movable contact 75 of a single pole double throw switch 76, Figure 5, operated by a vehicle speed responsive centrifugally operated governor 77, is electrically connected in series with an accelerator operated breaker switch 78, a dash mounted cutin breaker switch 79, the ignition switch 80 of the car and a grounded battery 81. No claim is made to the breaker switches 73, 78, and 79 for the same include the usual fixed contact and a spring operated movable contact the spring being overcome to close the switch. A switch 75, 83 of the switch 76 is closed, to effect a low gear operation of the transmission, when the vehicle is at a standstill or is traveling below a certain speed; and a switch 75, 84 of the switch 76 is closed, to effect a high gear setting of the transmission, when the vehicle is traveling at or above the aforementioned speed, that is above governor speed.

The fixed contacts 83 and 84 of the governor operated switch 76 are electrically connected respectively to fixed contacts 85 and 86 of a selector switch mechanism 87 operated by the motor operated transmission operating crank 14; and to one end of the movable contact 88 of the latter switch mechanism there is pivotally connected a link 90 which is pivotally connected to the crank 14. The movable contact 88 is electrically connected to the grounded solenoid 63 by electrical means including a conductor plate 91 and a breaker switch 92 referred to hereinafter. A fixed contact 93 of the switch 87 is electrically connected in series with the motor operated breaker switch 73 and the cutin switch 79.

Contacts 85 and 88, contacts 88 and 93, and contacts 86 and 88 of the selector switch mechanism 87, provide three separate switches two of which are in series with the two switches of the governor operated switch 76; and the third, that is, the switch 88, 93 is in series with switch 73. The movable contact 88 is preferably so connected with the transmission operating crank 14 and the switch mechanism 87 is so constructed that the switch 86, 88 is closed when the transmission is established in its second gear setting, the switch 85, 88 is closed when the transmission is established in its high gear setting, and the switch 88, 93 is at all times closed except when the transmission is completely or substantially completely established in either of these two settings. The breaker switch 73 is actuated by the piston 67 of the motor 51 and is made at all times except when said piston is in its released position, that is, the position of the piston when the transmission is in gear.

The breaker switch 92, Figures 3 and 4, including a movable contact 111 and a fixed contact 113, is housed within a casing 115 the contact 111 being moved out of contact with the contact 113 by a cam shaft 117 connected to the motor operated shaft 45; and breaker switch 101, referred to hereinafter and duplicating the switch 92, is also operated by the cam shaft 117. The parts of the mechanism, including the shape of the cam faces on the shaft 117 and the connection between the shaft 45 and the shaft 117, are so constructed and arranged and so operative that the switch 92 is closed, by an operation of the motor 41, just as a face portion 49' of the latch 48 is leaving the top of the recess 50 in the crank 52 as the lever 46 is being rotated; and said switch remains closed at all times when the latch 48 is clear of said recess. The parts of the mechanism are also so constructed and arranged and so operative that the switch 101 is closed at the same or substantially the same time the switch 92 is opened, that is, when the latch 48 is entering or is about to enter the recess 50 or is about to contact a face portion 119 of the crank 52; and the camming operation of the switch 101 is such that said switch is then opened shortly after the latch face 49' enters the recess 50 and before the latch 48 is completely nested within said recess.

As to the control of the clutch control valve 61 the solenoid 64 for operating said valve is electrically connected directly to the movable contact 88 of the selector switch 87 thereby insuring an operation of the clutch motor 27' to disengage the clutch when the motor 51 is energized to operate the transmission. As another feature of our invention there is provided a separate electrical control means for the clutch motor 27'. This control means includes a switch 95 actuated by the gear shift lever 24 to close said switch whenever the shift lever 24 is moved to operate the transmission. As is disclosed in Figure 2 this switch 95 constitutes a part of the electrical means directly interconnecting the switch 78 and the solenoid 64. There is thus provided means for disengaging the clutch by the motor 27' irrespective of whether or not said motor is operable incidental to the operation of the transmission by the motor 51. In other words with the switches 78, 79, 80, and 95 closed the clutch is power operated to facilitate a manual operation of the transmission to establish any one of its settings.

The solenoid 64 preferably includes two separate windings each being grounded as disclosed in Figure 2. One of the windings is electrically connected to the shift lever operated switch 95 and the other winding is electrically connected to the movable contact 88 of the switch 87. There is thus provided means for preventing an undesired operation of the transmission operating motor 51 when the driver either moves the shift lever to effect a manual operation of the transmission or accidentally moves said lever; and as will be obvious from an inspection of Figure 1 these operations could not be effected if the solenoid 64 included but one winding connected to the contact 88 and switch 95.

Figures 3, 4, 5, 6, 7, 8:
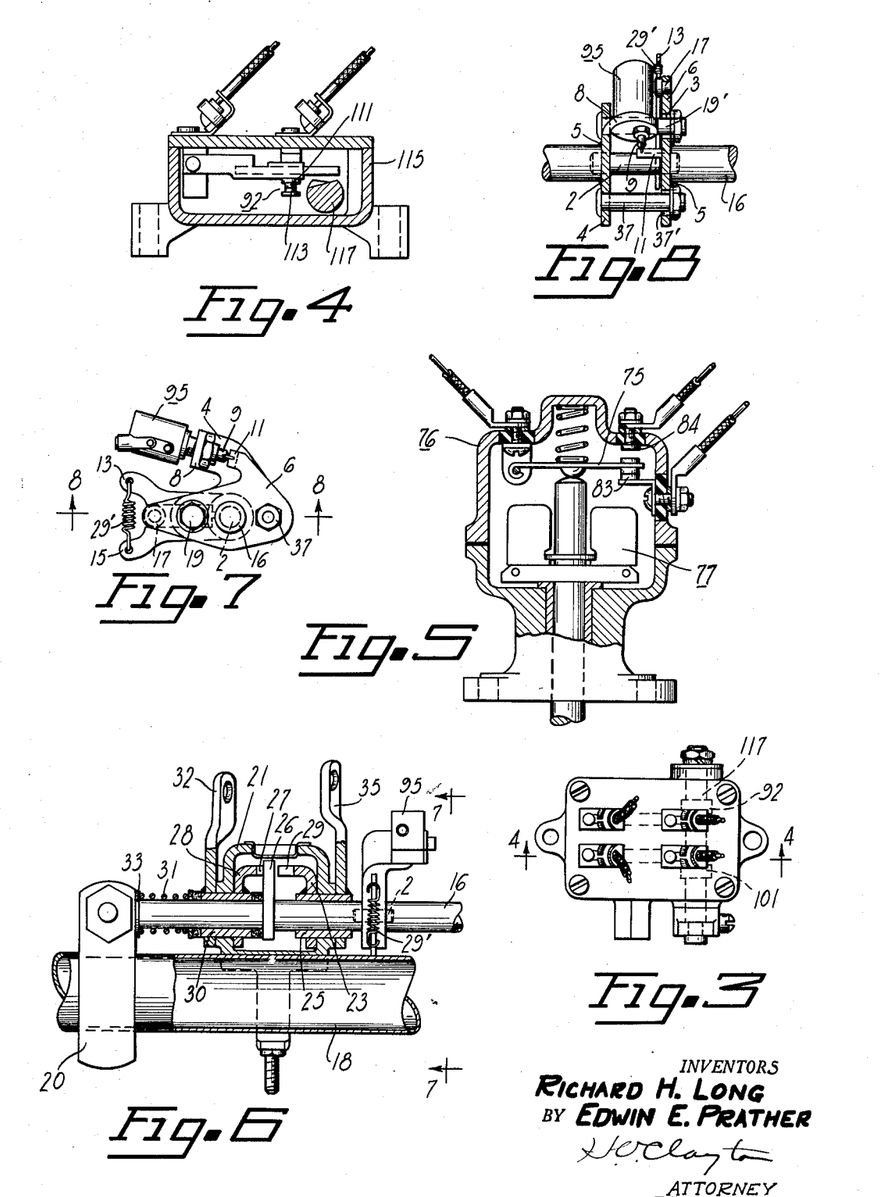
Figure 3 is a plan view of the latch motor operated latch switch and automatic switch mechanism of our invention.
Figure 4 is a sectional view, taken on the line 4—4 of Figure 3, disclosing details of the switch mechanism of said figure.
Figure 5 is a sectional view disclosing details of the governor operated switch mechanism of our invention.
Figure 6 is a view, largely in section, disclosing details of a part of the linkage interconnecting the shift lever with the change speed transmission and also disclosing the shift lever operated clutch control switch of our invention.
Figure 7 is a view, taken on the line 7—7 of Figure 6, disclosing the manually operated clutch control switch of our invention and the switch lever operated mechanism for operating said switch.
Figure 8 is a sectional view taken on the lines 8—8 of Figure 7, disclosing details of the switch operating mechanism of Figure 7.

The switch 95 and the mechanism for operating the same is disclosed in detail in Figures 6, 7, and 8 and includes a relatively short pin 2 serving as a means for aligning spaced apart sections of the shift lever operated rod 16. As is disclosed in Figure 8 the ends of the pin 2 are seated within recesses in the adjacent parts of the rod 16. A two-armed crank 4 is fixedly secured, as by welds 5, to the upper end of the lower part of the two part rod 16; and a two-armed crank 6 is fixedly secured to the lower end of the upper part of said rod. Posts 19' and 37, fixedly secured to the crank 4, extend respectively through openings 3 and 37' in the crank 6. The crank 4 is preferably provided with a tab portion 8 struck out of the body of the crank. The breaker switch 95 is secured to the tab 8 and said switch is actuated in part by a pin 9 extending within the body of the switch housing. Briefly describing the construction of the switch 95 the pin 9 is biased, by spring means within the switch, to its switch open position said position of the pin being disclosed in Figure 8. The pin 9 is connected by a tab 11 extending from the crank 6; and the switch is so constructed that the same is closed either when the tab 11 is moved in either direction, Figure 7.

Describing now the mechanism for actuating the switch operating tab 11, pawls 13 and 15, rotatably mounted at their lower ends upon the pin 2, are biased toward each other into contact with a pin 17 by means of a spring 29' said spring being connected to the upper ends of the pawls. The pin 17 is fixedly secured to the upper end of the crank 6. Incidentally no claim is made to the switch 95 per se or to the above described mechanism for operating said switch.

Describing now the operation of the switch 95 the same is closed when the driver of the vehicle rotates the shift lever 24 in a plane parallel or substantially parallel to said lever to effect either a manual operation of the transmission or a setting of the shift lever in its high gear position in the operation of preparing the mechanism for a power operation thereof; and with this operation the crank 6 is rotated in one direction or the other. Describing this switch closing operation in greater detail the lower section of the two part rod 16 and the crank 4 secured thereto remain stationary as the crank 6 is rotated to close the switch this operation being effected by virtue of the fact that less force is required to expand the spring means, not shown, within the switch than is required to rotate the crank 4. In effecting this closing operation of the switch 95 the crank 6 is rotated around the pin 2 as a fulcrum said rotation being made possible by virtue of the lost motion provided by the movement of the posts 19' and 37 within the openings 3 and 37' respectively. The closing of the switch 95 then initiates an operation of the motor 27' to disengage the clutch thereby disconnecting the engine from the transmission said operation being defined as a torque reversal operation of the power plant of the vehicle; and immediately after the latter operation is completed there is initiated a rotation of all of the parts of the mechanism of Figure 8 as a unit with a resulting operation of the transmission. Then after the operation of the transmission is completed the driver will remove his hand from the shift lever thereby permitting the spring 29' to return the pawls 13 and 15 in position against the pin 17 and permitting the spring means within the switch to center the posts 19' and 37 in the openings 3 and 37' and to open the switch.

There is thus provided by the switch 95 and the means for operating the same, means for controlling the operation of the clutch by an operation of the shift lever the clutch being disengaged prior to an operation of the transmission and automatically re-engaged when the driver removes his hand from the shift lever. It is also to be noted that the shift operating mechanism of Figures 6, 7, and 8 is not operative to effect an operation of the clutch when the shift lever is actuated to effect what is known as a cross shift operation of the transmission, that is an upward bodily movement of the rod 16 preliminary to effecting an operation of the low and reverse gear operating crank 35, Figure 6.

One of the most important features of our invention lies in the means, operable at the will of the driver of the vehicle, for either completely operating the transmission by the physical effort of the driver or effecting the second and high gear settings of the transmission by the operation of the power means the gear shift lever remaining immobile during the latter operation. A part of the mechanism for effecting this control has been described above, that is, the latch mechanism 38, the latch motor 41 for operating the latch mechanism and electrical means for controlling the solenoids 63 and 64. As to the means for controlling the latch motor 41 the solenoid 65 which operates the three way valve 62, is controlled by a switch 96 constituting one of the two switches of a single pole double throw switch 97 of standard design said switch being actuated by the second and high gear operating crank 32, Figure 1. The remaining switch of the switch mechanism 97 is indicated by the reference numeral 99 and is referred to hereinafter.

Assuming that the driver desires a second and high gear power operation of the transmission he will place the shift lever 24 in its high gear position and this operation serves to close the switch 96 and open the switch 99. The driver will then close the switch 79 and release the accelerator to close the switch 78 whereupon the solenoid 65 is energized to open the valve 62 to thereby energize the latch motor 41. The latter operation serves to rotate the latch lever 46 in a counter-clockwise direction, Figure 1, thereby moving the latch 48 out of the recess 50 to disconnect the shift lever from the transmission operating crank 14. As described above when the piston 43 has moved sufficiently to bring the face portion 49' of the latch 48 clear of the face 119 of the crank 52 the switch 92 is closed by the operation of the cam shaft 117, Figure 4; and as will be noted from an inspection of Figure 2 of the drawing the closing of the switch 92 completes the electrical circuit to effect an energization of the solenoid 63.

It is apparent therefore that when the driver wishes to effect a power operation of the transmission he need but close the switches 78 and 79 and then move shift lever to place the transmission in its high gear setting. This operation of the shift lever closes the switch 95 to effect an operation of the motor 27' to disengage the clutch and also effects an energization of the latch motor 41 the latter operation serving to disconnect the shift lever from the transmission to render said lever immobile and at the same or substantially the same time, by the closing of the switch 92, render the power means operative to operate the transmission. It is assumed of course that the engine is at the time operating to provide a source of vacuum to energize the motors 27', 41 and 51; and to effect an operation of the engine it is of course necessary to close the ignition switch 80 which constitutes one of the electrical controls for controlling the solenoid 63.

After the above described operation of the mechanism is completed the transmission is power operated to establish its second gear setting assuming that the car is at a standstill or is traveling below governor speed, that is the speed resulting in a closing of the switch 75, 83, Figure 2. Describing this operation of the mechanism it will be remembered that when the transmission is manually operated from its second gear setting to establish the same in its high gear setting that the parts of the latch mechanism 38 assume the locked positions disclosed in Figure 1; accordingly, after the motor 41 is energized to move the latch 48 out of the recess 50 and when the motor 51 is then energized to effect a second gear setting of the transmission, the shift lever and parts connected thereto are rendered immobile. In this operation of establishing the transmission in its second gear setting the crank 52 is rotated counterclockwise, Figure 1, to bring face 119 under the face 49' of the latch 48. It is also to be remembered that the switches 73 and 79 are open as the aforementioned manually operated high gear setting of the transmission is being effected.

Continuing the description of the operation of the mechanism of our invention just as the transmission is being established in its second gear setting the switch 86, 93, Figure 2, is opened and the switch 86, 88 closed thereby automatically de-energizing the motor 51. The motor spring 71 then expands to preselect the alternator 55 for a subsequent high gear operation of the transmission; and a return spring 121 of the clutch motor 27' expands to re-engage the clutch of the vehicle.

The driver will then depress the accelerator to speed up the engine to get the vehicle under way in second gear and when a certain vehicle speed is reached, say a speed above 16 miles per hour, the switch 75, 84, Figure 1, is closed thereby again energizing the solenoid 63 to effect a high gear operation of the motor 51. The clutch motor 27' is, with this operation, again energized to disengage the clutch thereby facilitating this high gear operation of the transmission; and when this setting of the transmission is completed the switch 86, 93 is opened and the switch 85, 88 closed thereby de-energizing the motors 27' and 51 to engage the clutch and operate the alternator 55 to prepare the same for a subsequent second gear operation of the mechanism. The crank 14 is thus automatically moved back and forth to shuttle the transmission between its high and second gear settings the latter setting being effected in the operation of bringing the car to a stop. If desired a breaker switch 55' may be included in the electrical connection between the accelerator operated switch 78 and the contact 75 of the governor operated switch 76 said breaker switch being closed by the piston 67 of the motor 51 when said piston is in its released, that is, motor de-energized position. Explaining the operation of the switch 55' should the driver suddenly apply his brakes to reduce the speed of the vehicle below governor speed as the high gear operation of the transmission is being effected then the motor 51, by virtue of the presence of the switch 55', will be automatically again energized to establish the transmission in its second gear setting when the piston 67 is moved to close the switch 55'. This unusual operation of the mechanism may be termed a recycle operation.

It will now be assumed that the car is at a standstill with the motor idling and the transmission established in its second gear setting; and it will also be assumed that the driver wishes to again manually operate the transmission; for example he may wish to place the transmission in low gear. To accomplish this end the driver will move the shift lever 24 out of its high gear position thereby rotating the crank 42 counterclockwise, Figure 1, and breaking the switch 96 to effect a spring energization of the spring and pressure differential operated latch motor 41. In effecting this operation the single pole double throw switch 97 mechanism is operated to both open the switch 96 and close the switch 99 of said mechanism. A return spring 100 within the motor 41 then expands to rotate the lever 46 in a clockwise direction, Figure 1, and when the latch 48 is about to enter the recess 50, that is, when the latch 48 is in a position contacting or just about to contact the face 119 of the crank 52, the breaker switch 101 is closed thereby completing an electrical circuit to energize the solenoid 63. The motor 51 is accordingly again energized to rotate the crank 52 in a clockwise direction, Figure 1, to expedite the operation of meshing the latch 48 in the recess 50. In this operation the crank 52 and crank 42 with the latch 48 secured thereto, rotate towards each other assuming of course that the clockwise rotation of the crank 52 is initiated before the latch 48 is moved all the way to its second gear position. Now it will be remembered that the switch 92 is opened when the face 49' of the latch 48 contacts or is just about to contact the face portion 119 of the crank 52; and it will also be remembered that the switch 101 is closed at the same time or substantially the same time that the switch 92 is opened and that the switch 101 then remains closed for a short period of time as the latch 48 is entering the recess 50. This operation of the electrical controls, that is, the operation occurring during the re-establishing of the manual operation of the transmission, serves to cut off the electrical connection between the solenoid 63 and the switch 87 as the electrical connection between the solenoid 63 and the switch 99 is completed; and the latter connection is only of brief duration. It follows therefore that the motor 51 is de-energized in sufficient time to prevent its impeding the operation of manually establishing the transmission in its second gear setting.

There is thus provided, by the spring and pressure differential operated latch motor 41, the breaker switches 92 and 101 operated by said motor, and the single pole double throw switch 97, power means cooperating with the remainder of the mechanism to effect either a power operation of the transmission to establish the same in its second and high gear settings or to effect a manual operation of the transmission, the changeover from the power operation to the manual operation being expedited by the above described operation of the latch motor. With the latter operation the crank 52 and the latch 48 move toward each other to expedite the interconnecting of these parts of the mechanism.

Describing now the complete operation of the mechanism of our invention and incidentally completing the description of the parts of said mechanism not heretofore described, it will be assumed that the vehicle is at a standstill, the switches 78 and 79 are closed, the engine is idling, and the shift lever 24 is in its high gear position to make possible a power operation of the transmission; and under these conditions the transmission will be established in its second gear setting. Explaining the operation of the mechanism to effect this second gear setting, the switches 78, 79, and 80, the switch 85, 88, and the switch 75, 83 are closed as the vehicle is being decelerated to a stop the latter switch being closed at a certain critical speed. The solenoid 63 is then energized to open the valve 60 and this results in an energization of the motor 51 to effect the second gear setting of the transmission, the electrical circuit including said switches being automatically opened, by the opening of the switch 88, 93, just before the setting of the transmission is effected.

Explaining this operation in greater detail it is to be remembered that the selector switch 88, 85 is closed when the transmission is established in its high gear setting this operation being effected to prepare the mechanism for a low gear operation of the mechanism; and it is also to be remembered that the governor switch 75, 83 is automatically closed, to initiate the second gear operation of the mechanism, when the speed of the vehicle is brought down to a certain factor.

With the opening of the latter circuit the piston 67 of the motor 51 returns to its transmission engaged position and with this operation the switch 73 is opened, the switch 86, 88 is closed, and the crank 72 of the alternator is returned to its preselecting position. The mechanism is then prepared for a subsequent power operated high gear operation of the transmission. As to the above described second gear operation of the mechanism, it is to be remembered that the clutch is power operated to facilitate the operation of the transmission.

The transmission being established in its second gear setting, the driver, to get the vehicle under way, will then depress the accelerator; and this operation in getting the vehicle under way in second gear is facilitated by the operation of the centrifugal and spring operated clutch controlled in part by the crank 24'. When the speed of the vehicle exceeds governor speed the switch 75, 84 of the governor switch 76 will be automatically closed and then when the driver releases the accelerator to close the throttle and close the switch 78 there will be effected another energization of the motors 27' and 51 to disengage the clutch and effect a high gear setting of the transmission. As the high gear setting is being completed, switch 88, 93 is opened thereby again initiating the return of the pistons 67 and 121 to therein released positions.

The transmission will then be shuttled back and forth between its second and high gear settings depending upon the speed of the vehicle, the clutch being operated to facilitate these power operations of the transmission. In this operation one or the other of the motor operated selector switches 85, 88 and 86, 88 is made just as the transmission is being established in gear thereby preparing the mechanism for a subsequent operation of the transmission; and said operation is then initiated by the operation of the governor switch 76.

Should the driver then desire to effect a manual operation of the transmission aided by the power operation of the clutch, he will move the shift lever out of its high gear position thereby effecting an operation of the spring and pressure differential operated latch motor 41 and the transmission operating pressure differential operated motor 51 to interconnect the shift lever with the transmission operating crank 14; and thereafter the transmission may be completely manually operated; for example the driver may, at any vehicle speed, overrule the control of the mechanism by the governor operated switch 76 by moving the shift lever to place the transmission in its second gear setting.

The mechanism of our invention may also include means, operable at the will of the driver, for overruling the governor operated switch 76 to provide means for establishing the transmission in second gear when the vehicle is traveling above governor speed, that, a speed sufficient to close the switch 75, 84; and at this time the switch 85, 88 is closed inasmuch as the transmission is established in high gear. Describing this governor overruling or oft-called kick down mechanism of our invention there is provided a breaker switch 131 preferably actuated by the accelerator, the latter being indicated by the reference numeral 133. As is disclosed in Figures 1 and 2 the switch 131 is included in the electrical connection between the fixed contact 85 of the switch 87 and the accelerator operated switch 131, said switch 131 being electrically connected in parallel with the switch 75, 83 of the governor operated switch 76. If desired a wind operated breaker switch 135 may be connected in series with the switch 85, 88 and the switch 131, this switch 135 being operated by a lever member 137 to one end of which is connected a blade 139. The blade is preferably so mounted that it receives the blast of air from the radiator cooling fan of the vehicle accordingly there is provided means for opening the switch 135 when the speed of the car reaches a predetermined maximum, say 35 M. P. H.

Describing now the governor overruling, that is, kick down operation of the mechanism of our invention the driver, to effect the second gear setting of the transmission, will appreciably depress the accelerator thereby closing the switch 131 the switch 135 being at the time closed; and the closing of the switch 131 will effect an operation of the motors 41 and 51 to establish the transmission in second gear and operate the clutch to facilitate said operation of the transmission. In this operation the motors are de-energized by a depression of the accelerator to open the switch 78; for the switches 75, 84 and 86, 88 are at this time closed making an opening of the accelerator switch 78 necessary.

There is thus provided means, operable at the will of the driver and when the vehicle is traveling below a certain speed, for overruling the governor operated switch 76 to effect a second gear operation of the mechanism of our invention.

Although only one embodiment of the invention has been illustrated and described, various changes in the form and relative arrangements of the parts may be made to suit requirements.

We claim:

1. Manually and power operated control means adapted to operate the transmission and clutch of an automotive vehicle including a gear shift lever, force transmitting means, including a latch mechanism, connected with the gear shift lever and adapted to be connected to the transmission, a transmission operating fluid pressure motor, force transmitting means connected with the latter motor and adapted to be connected to the transmission, a clutch operating fluid pressure motor, force transmitting means connected with the latter motor and adapted to be connected with the clutch, a latch operating fluid pressure motor, force transmitting means interconnecting the latter motor with the latch mechanism; and means, operative after the shift lever is placed in a certain position, for controlling the operation of said three motors to alternately effect first one and then the other of two settings of the transmission, to operate the clutch to facilitate said operations of the transmission, and to operate the latch mechanism to immobilize the gear shift lever when the transmission is being power operated and to connect the gear shift lever to the transmission when the latter is to be manually operated, said control means including valve means for controlling the transmission operating motor, valve means for controlling the clutch operating motor, and valve means for controlling the latch operating motor; and means for controlling the operation of the said valves including, in series, a manually operated cutin switch and a switch adapted to be operated by the accelerator of the vehicle, and further including a governor operated single pole double throw switch mechanism including two switches, a motor operated selector switch mechanism including two switches one of said two switches being connected in series with one of the two switches of the governor operated switch mechanism and the other of the two switches of the motor operated selector switch mechanism being connected with the other of the two switches of the governor operated switch mechanism, a switch operated by the latch operating motor, and a valve operating solenoid, said switches being operative, together with the remainder of the controls cooperating therewith, to effect the aforementioned second and high gear power operation of the transmission; and electrical means for controlling the operation of the latch motor said operation facilitating the operation of the latch mechanism in its operation of reconnecting the gear shift lever with the transmission.

2. Manually and power operated control means adapted to operate the transmission and clutch of an automotive vehicle including a gear shift lever, force transmitting means, including a latch mechanism, connected with the gear shift lever and adapted to be connected to the transmission, a transmission operating fluid pressure motor, force transmitting means connected with the latter motor and adapted to be connected to the transmission, a clutch operating fluid pressure motor, force transmitting means connected with the latter motor and adapted to be connected with the clutch, a latch operating fluid pressure motor, force transmitting means interconnecting the latter motor with the latch mechanism, and means, operative after the shift lever is placed in a certain position, for controlling the operation of said three motors to alternately effect second and high gear power operations of the transmission, to operate the clutch to facilitate said operations of the transmission and to operate the latch mechanism to immobilize the gear shift lever when the transmission is being power operated and to connect the gear shift lever to the transmission when the latter is to be manually operated, said control means including valve means for controlling the transmission operating motor, valve means for controlling the clutch operating motor, and valve means for controlling the latch operating motor; and means for controlling the operation of the said valves including, in series, a manually operated cutin switch and a switch adapted to be operated by the accelerator of the vehicle, and further including a governor operated single pole double throw switch, a motor operated selector switch mechanism including two switches, one being connected in series with one of the two switches of the governor operated switch and the other of the selector switches being connected in series with the other of the governor operated switches, a switch operated by the latch operating motor, and a valve operating solenoid, said switches being operative, together with the remainder of the controls cooperating therewith, to effect the aforementioned second and high gear power operations of the transmission; electrical means for controlling the operation of the latch motor including a switch which is closed to effect an energization of said motor when the gear shift lever is placed in its high gear setting said lever, by said energization, of the motor, being then immobilized, and electrical means including another switch actuated by the latch motor and operative to control the operation of the transmission operating motor said operation facilitating the operation of the latch mechanism in its operation of reconnecting the gear shift lever with the transmission.

3. Manually and power operated means adapted to operate the change speed transmission and friction clutch of the power plant of an automotive vehicle said vehicle being provided with a transmission operating shift lever movable to a plurality of positions including a position to establish the transmission in a high gear setting, said transmission and clutch operating means comprising pressure differential operated power means adapted to be connected to the transmission and clutch and operable to disengage the clutch and operate the transmission and to subsequently effect a re-engagement of the clutch, force transmitting means interconnecting the shift lever and the transmission and operable to effect a manual operation of the transmission, valve means for controlling the operation of the power means, and means, including electrical means, for controlling the operation of said valve means to effect the aforementioned cycle of power operations of the mechanism that is to disengage the clutch and operate the transmission and then re-engage the clutch, said electrical means including, in series, a manually operated cutin switch and a shift lever operated switch operable to cut in the operation of the power means when said lever is placed in its high gear position.

4. Manually and power operated means adapted to control the operation of the change speed transmission and friction clutch of the power plant of an automotive vehicle said vehicle being provided with a transmission operating shift lever movable to a plurality of positions including a position to establish the transmission in a high gear setting, said control means comprising a pressure differential operated motor operably connected to the clutch and a pressure differential operated motor operably connected to the transmission by means including an alternator mechanism, said motors being operable to disengage the clutch and operate the transmission to alternately establish the same in its high gear and second gear settings and to subsequently effect a re-engagement of the clutch; force transmitting means interconnecting the shift lever and the transmission and operable to effect a manual operation of the transmission, valve means for controlling the operation of the power means, and means, including electrical means, for controlling the operation of said valve means to effect the forementioned cycle of power operations of the clutch and transmission, said electrical means including a manually operated cutin switch and a shift lever operated switch operable to cut in the operation of the power means when said lever is placed in its high gear position.

5. Manual and power operated control means adapted to control the operation of the change speed transmission and friction clutch of the power plant of an automotive vehicle provided with a transmission operating shift lever movable to a plurality of positions including a position to establish the transmission in its high gear setting, said control means comprising power means including pressure differential operated means operably connected to the transmission and clutch and operable to disengage the clutch and at substantially the same time operate the transmission and to then effect a re-engagement of the clutch; force transmitting means, including a latch mechanism, interconnecting the shift lever and transmission and operable to effect a manual operation of a part of the transmission mechanism, valve means for controlling the operation of the pressure differential operated means, power means, including a spring and pressure differential operated motor, for cutting into operation the aforementioned pressure differential operated means and for operating the latch mechanism to immobilize the shift lever when the transmission and clutch are being power operated, valve means for controlling the operation of the latter motor, and electrical means, including a switch which is closed when the shift lever is placed in its high gear position, for controlling the operation of both of said valve means.

6. Manual and power operated control means adapted to control the operation of the change speed transmission and friction clutch of the power plant of an automotive vehicle provided with a transmission operating shift lever movable to a plurality of positions including a position to establish the transmission in its high gear setting, said control means comprising power means including a pressure differential operated motor operably connected to the clutch, a pressure differential motor operably connected to the transmission, and force transmitting means, including a direction changing mechanism, interconnecting the latter motor and transmission, said motors being operable to disengage the clutch and at substantially the same time operate the transmission to establish the same either in its high gear setting or its second gear setting and to subsequently effect a re-engagement of the clutch; force transmitting means, including a latch mechanism, adapted to interconnect the shift lever and transmission and operable to effect a manual operation of the transmission mechanism, valve means for controlling the operation of the pressure differential operated means, power means, including a spring and pressure differential operated motor, for cutting in and cutting out of operation the aforementioned pressure differential operated means and for operating the latch mechanism to immobilize the shift lever when the transmission and clutch are being power operated, valve means for controlling the operation of the latter motor, and the electrical means, including a switch which is closed when the shift lever is placed in its high gear position, for controlling the operation of both of said valve means.

7. Manual and power operated means adapted to control the operation of the change speed transmission and friction clutch of the power plant of an automotive vehicle provided with a transmission operating shift lever, said control means comprising a pressure differential operated motor operably connected to the clutch, a pressure differential motor adapted to be connected to the transmission and operative to establish the same either in a high gear setting or low gear setting, force transmitting means, including a latch mechanism, operable to effect a manual operation of the transmission, other force transmitting means, including a direction changing mechanism, interconnecting the transmission operating motor with the tranmission, valve means for controlling the operation of said motors, and means for controlling the operation of said valve means including a cutin switch operated by the gear shift lever when said lever is placed in a certain position and further including a spring and pressure differential operated motor for operating the latch mechanism to immobilize the gear shift lever when the transmission and clutch are being power operated, the latter operation being made possible by the closing of the aforementioned cutin switch.

8. Manual and power operated control means adapted to control the operation of the change speed transmission and friction clutch of the power plant of an automotive vehicle provided with a gear shift lever, said means comprising a single acting fluid operated motor operably connected to the clutch, a single acting fluid pressure operated motor adapted to be connected to the transmission, said motors being operable when energized to disengage the clutch and operate the transmission and one of said motors being operable, when de-energized, to make possible a re-engagement of the clutch, force transmitting means interconnecting the gear shift lever and a part of the transmission and operable to effect two of the settings of the latter mechanism, other force transmitting means, including a latch mechanism, interconnecting the gear shift lever and a part of the transmission and operable to effect a manual operation of a part of the transmission, other force transmitting means interconnecting the latter part of the transmission with the power element of the transmission operating motor, valve means for controlling the operation of said motors, and means for controlling the operation of said valve means and latch mechanism including a breaker switch, and a pressure differential and spring operated motor connected to the latch mechanism.

9. Manually and power operated means for operating a change speed transmission and a fluid clutch of the power plant of an automotive vehicle comprising a gear shift lever, said means including a fluid pressure motor for operating the transmission and a fluid pressure motor operating the clutch, force transmitting means, comprising a latch mechanism, interconnecting the gear shift lever and transmission, other force transmitting means interconnecting the transmission and the transmission operating motor, and means for operating the latch mechanism and for controlling the operation of the fluid pressure motors to either make possible a manual operation of the transmission or effect a power operation thereof, said means including a latch operating motor, a vehicle speed responsive governor, valve means for controlling the operation of the transmission operating motor, valve means for controlling the operation of the clutch operating motor, valve means for controlling the operation of the latch operating motor, and means, controlled in part by the governor and in part by the gear shift lever, for controlling all three valve means to effect an energization of all three motors to disengage the clutch and operate the transmission, immediately followed by a de-energization of the clutch operating motor to effect a re-engagement of the clutch.

RICHARD H. LONG.
EDWIN E. PRATHER.

REFERENCES CITED

The following references are of record in the file of this patent:

UNITED STATES PATENTS

| Number | Name | Date |
| --- | --- | --- |
| 2,187,824 | Britton | Jan. 23, 1940 |
| 2,257,511 | Neff | Sept. 30, 1941 |
| 2,328,921 | Neff | Sept. 7, 1943 |
| 2,434,717 | Randol | Jan. 20, 1948 |